(12) United States Patent
Edwards et al.

(10) Patent No.: US 6,206,424 B1
(45) Date of Patent: *Mar. 27, 2001

(54) FURNITURE SLIDE

(76) Inventors: Donald J. Edwards, 28 Government Rd., Irwin, PA (US) 15642; Donald V. Edwards, 17 Edna Rd., Adamsburg, PA (US) 15611

(*) Notice: Subject to any disclaimer, the term of this patent is extended or adjusted under 35 U.S.C. 154(b) by 0 days.

This patent is subject to a terminal disclaimer.

(21) Appl. No.: 09/441,713

(22) Filed: Nov. 16, 1999

Related U.S. Application Data

(63) Continuation-in-part of application No. 08/253,721, filed on Jun. 3, 1994, now Pat. No. 5,984,360.

(51) Int. Cl.⁷ .................................................. A47B 91/06
(52) U.S. Cl. .................... 280/845; 16/42 R; 248/346.11; 280/28.17
(58) Field of Search ........................ 280/842, 845, 280/205, 11.18, 18, 18.1, 19, 23.1, 24, 28.12, 28.17, 28.18, 5.24, 7.12, 8, 47.34, 811; 472/88, 89; D34/28, 38; 15/247; 16/42 R; 108/65; 248/188.9, 346.11

(56) References Cited

U.S. PATENT DOCUMENTS

| | | | |
|---|---|---|---|
| 252,422 | * | 1/1882 | Briggs ..................................... 280/19 |
| 1,861,095 | * | 5/1932 | Schacht . |
| 1,982,138 | * | 11/1934 | Herold . |
| 2,317,080 | * | 4/1943 | Phillips . |
| 2,538,600 | * | 1/1951 | Swanson ................................ 280/19 |
| 3,177,518 | * | 4/1965 | Bergstrom . |
| 3,183,545 | * | 5/1965 | Bergstrom . |
| 3,326,508 | * | 6/1967 | Born . |
| 4,283,068 | * | 8/1981 | Keysear ................................. 280/24 |
| 5,220,705 | * | 6/1993 | Bushey ................................. 16/42 R |
| 5,557,824 | * | 9/1996 | Bushey ................................. 16/42 R |
| 5,743,506 | * | 4/1998 | Adams ............................. 248/346.11 |
| 5,802,669 | * | 9/1998 | Wurdack .............................. 16/42 R |
| 5,984,360 | * | 11/1999 | Edwards et al. ..................... 280/845 |

FOREIGN PATENT DOCUMENTS

| | | | |
|---|---|---|---|
| 1013033 | * | 12/1965 | (GB) ................................... 16/42 R |
| 0218204 | * | 10/1985 | (JP) .................................. 280/28.17 |

* cited by examiner

*Primary Examiner*—Anne Marie Boehler
(74) *Attorney, Agent, or Firm*—Carothers & Carothers

(57) ABSTRACT

A furniture slide for moving furniture over a floor surface and also serving to provide foam drying blocks under the furniture for placement on wet carpet surfaces. The furniture slide of the present invention includes a sheet of material having a convex bottom base for sliding on a floor surface and further includes compressible material that is adhered to the top face of the sheet for support contact with the furniture to be moved. This compressible material is precut whereby a plug of the compressible material may be readily removed therefrom to provide a cavity in the compressible material. Then a slightly thicker Styrofoam drying block, which is dimensioned for insertion into this cavity, is inserted into the cavity. The drying block has an upper surface with a sticky adhesive so that the drying block sticks and remains adhered to the supported furniture when the remainder of the furniture slide is removed. The slide sheet is further provided with an upturned perimeter edge.

7 Claims, 2 Drawing Sheets

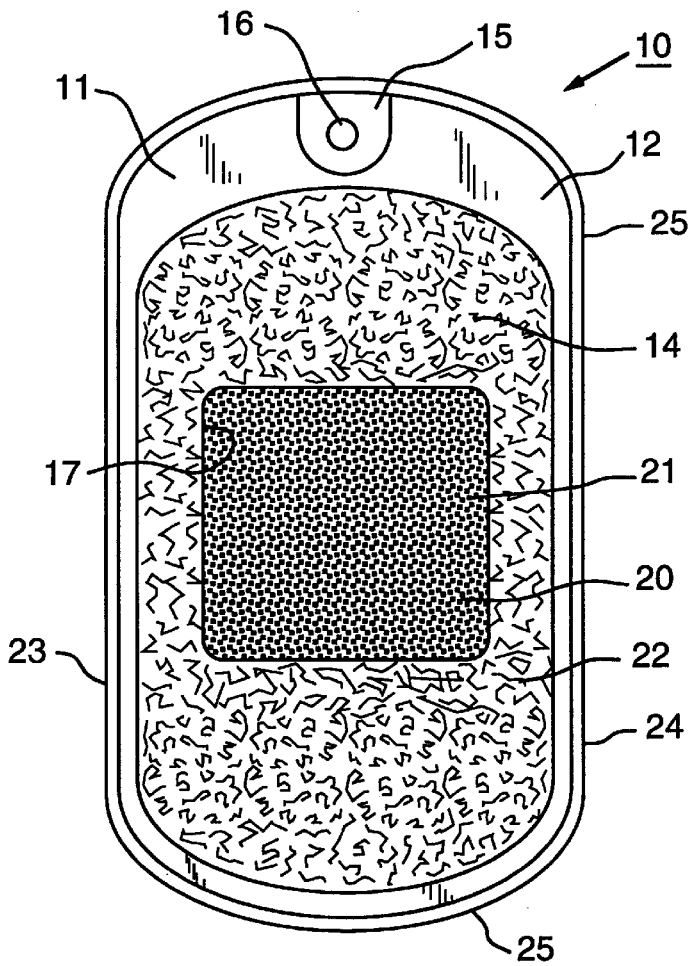
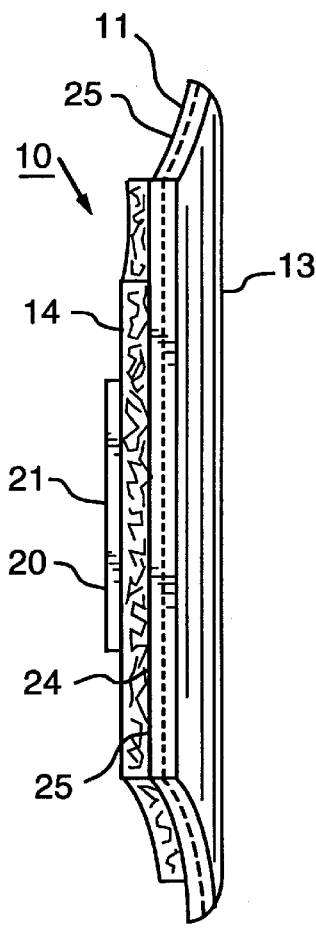
FIG. 4
FIG. 5
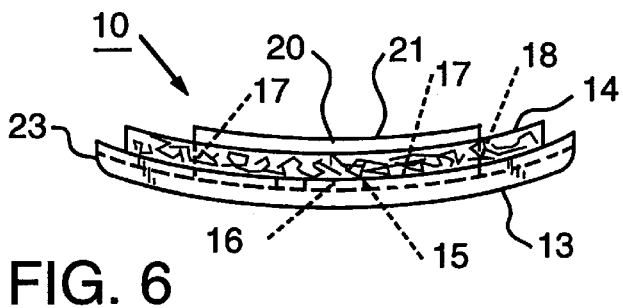
FIG. 6

FURNITURE SLIDE

CROSS REFERENCE

This application is a continuation-in-part of U.S. application Ser. No. 08/253,721, filed Jun. 3, 1994, now U.S. Pat. No. 5,984,360.

BACKGROUND OF THE INVENTION

This invention pertains to a furniture slide for easily and efficiently moving heavy objects across building floors. This invention is especially concerned with multiple of such furniture slides that may be used in cooperation with one another for the movement of furniture across floor surfaces of varying texture.

In the moving industry and in the carpet cleaning industry, it is quite usual to face the situation of having to move large, heavy and sometimes awkwardly shaped furniture within the confines of buildings. The most common method used for moving heavy objects is for the movers or cleaners to pick the object up and carry it by hand, but this is not always a feasible or preferable arrangement. With the exception of moving furniture up and down stairways, or a special orientation of heavy or awkwardly shaped furniture which requires lifting, it has been found that placing a separate one piece slide under the object to be moved and over the surface to which it is being moved, is beneficial so that the article may be slid across the horizontal surfaces which it must traverse in order to be relocated or moved within the confines of the building.

Various other prior art devices have been suggested for placing under the legs of furniture or placing under a furniture base which does not include legs, in order that the furniture may be moved across floor surfaces. The prior art devices, however, do not take into consideration all of the problems that are associated with moving heavy furniture or other objects across a flooring surface, which may even be a rugged surface. One of the problems that exists is that the surface sliding across the carpet must be a type of material that provides minimal friction between the carpet and the sliding surface, while the upper portion of the slide that meets with the furniture object must provide sufficient frictional contact with the furniture.

Further problems with furniture slides involve furniture slides catching upon the rugged surface on which it slides, causing the slides to come out from underneath the furniture object being moved. In addition, prior art devices, while solving some of the problems, do not specifically provide for a method of exerting a force on the furniture slide itself for movement of the furniture object. Some of the prior art devices, while providing furniture slides under the legs of furniture to be moved, require that the force to move the furniture must be exerted upon the furniture itself, either by a pushing or a pulling force. Such a method can be desirable, but can also introduce excessive stresses and strains on the furniture and on the person moving the object and provides no alternatives.

In addition, prior art furniture slides do not take into consideration the problems encountered when a carpet has been freshly cleaned and the furniture is repositioned. In this situation, when the furniture slides are removed, one is thereafter required to lift the furniture again off of its legs or bottom base and position Cellular expanding Polystyrene drying blocks or the like thereunder to isolate the furniture base from the underlying wet carpet.

SUMMARY OF THE INVENTION

The furniture slide of the present invention is for placement between an object to be moved and flooring over which it is to be moved, and is comprised of a sheet of material having a convex bottom face for sliding on floor surfaces and compressible material adhered to the top face of the sheet for support contact with an object to be moved. A plug of the compressible material is removable for thereby providing a cavity in the compressible material and a foam drying block dimensioned for insertion into the cavity is provided for direct support contact with the object to be moved.

The upper face of the foam drying block is applied with an adhesive whereby the block will remain adhered to or stuck to the object to be moved after the sheet with its adhered compressible material is removed from the block. Thus when the furniture slides are removed, the furniture is then simply lowered onto the underlying wet carpet which has just been scrubbed and the furniture is thereby isolated from the carpet.

This foam block is preferably thicker than the compressible material whereby the upper face of the drying block projects above the compressible material for insured engagement with the furniture leg or base.

Typically the foam drying blocks will be manufactured of cellular polystyrene such as Styrofoam.

The base sheet for the furniture slide is preferably provided in elongated form with opposing side and end edges with the curvature provided from side edge to side edge.

In addition, and also as a second independent inventive feature, an upturned rim is provided on all edges of the sheet to assist the slide in going over rough surfaces and moving through thick pile carpet.

Also, the base sheet includes a thickened portion adjacent one end edge with a passage through this thickened portion for securing a tow line so that, if desired, the furniture object may be towed with such tow lines and multiple furniture slides of the present invention.

In order to impart maximum slideability to the furniture slide, the base sheet may be comprised of a high density polyethylene material which has slippery surface qualities.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

FIG. 4 is a plan view of the furniture slide shown in FIG. 1 with a central plug portion of compressible material on the slide removed and replaced with a foam drying block;

FIG. 5 is a side view of the furniture slide shown in FIG. 4; and

FIG. 6 is an end view of the furniture slide shown in FIG. 4.

DETAILED DESCRIPTION OF A PREFERRED EMBODIMENT

Figure 1:
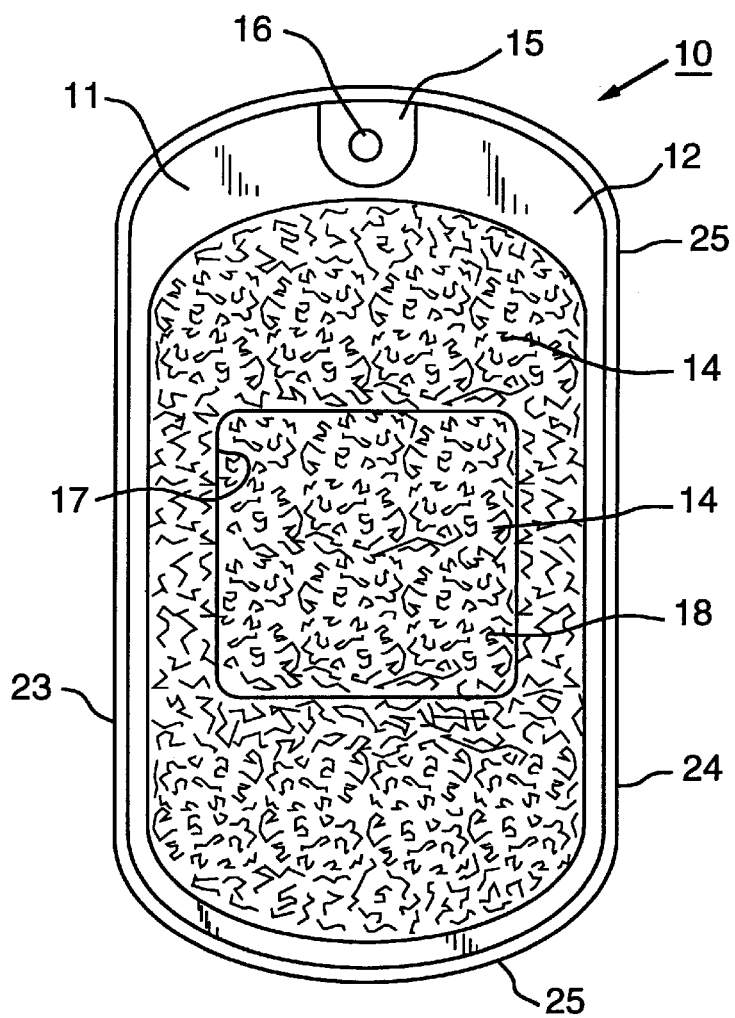
FIG. 1 is a plan view of a furniture slide according to the teachings of the present invention.
Figure 2:
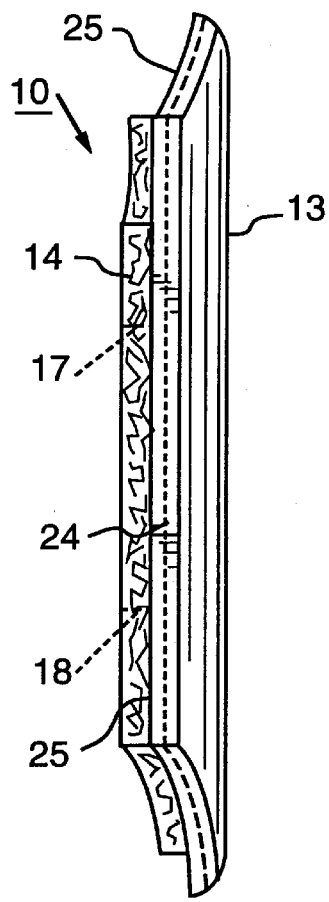
FIG. 2 is a side view of the furniture slide shown in FIG. 1.
Figure 3:
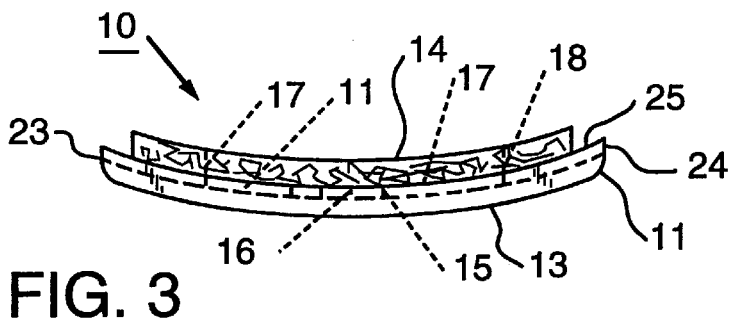
FIG. 3 is an end view of the furniture slide shown in FIG. 1.

Referring first to FIGS. 1, 2 and 3, the furniture slide 10 of the present invention is comprised of a sheet of material 11 having top and bottom faces 12 and 13 respectively, and a curvature which provides the convex bottom face 13 for sliding on a floor surface (not shown) which may be a carpet, a hardwood floor, and even rough surfaces, such as concrete.

In order to assist in the sliding capabilities of furniture slide 10, sheet 11 is preferably manufactured of high density polyethylene.

In addition, compressible material 14 in the form of a thick sheet of sponge rubber or the like is adhered to the top face 12 of sheet 11 for support contact with the leg or base (not shown) of furniture or another object to be moved.

In addition, sheet 11 is provided with a thickened portion 15 having a passage 16 drilled therethrough in order to provide means for securing a tow line for pulling the furniture slide 10 while furniture is resting thereon.

For a detailed discussion as to how the furniture slide 10 may be utilized, reference may be had to U.S. patent application Ser. No. 08/253,721, filed on Jun. 3, 1994.

The furniture slide 10 of the present invention varies from that shown in the parent application, not only by means of how the grommet tow line passage 16 is provided in the slide, but also in a vary important feature wherein a central plug 18 of compressible material 14 is removable therefrom for thereby providing a cavity 17 in the compressible material 14 which cavity is defined by the side walls of the cavity 17 and the upper face 12 of sheet 11.

After removal of plug 18 of compressible material 14, a foam drying block 20, which is dimensioned for insertion into cavity 17, is inserted into cavity 17 as illustrated in FIGS. 4, 5 and 6.

Foam drying block 20 is preferably constructed of a light weight foam material, such as cellular polystyrene. STYROFOAM Trademark, and is provided with a sticky adhesive upper surface 21 so that when a furniture base or leg (not shown) is rested down upon surface 21, it will adhere to the foam drying block 20 when sheet 11, together with its adhered compressible material 14, is removed from foam block 20.

Thus foam block 20 will remain temporarily stuck to or engaged with the bottom of a furniture leg or furniture base, and thus when the combination of sheet 11 with adhered compressible material 14 is removed from foam block 20, the furniture may be lowered so that the foam drying blocks are in contact with the wet underlying carpet (not shown) which has just been cleaned. After the carpet has dried, then the foam blocks may thereafter be removed.

This, as all carpet cleaners know, protects the carpet which has just been cleaned from staining and permits the carpet to dry without direct contact with the furniture.

In order to further assist with this feature, it should be noted in FIGS. 4, 5 and 6 that the upper adhesive surface 21 of foam block 20 is slightly higher than the upper surface 22 of the compressible material of 14. Accordingly, the furniture base or leg will heavily engage the adhesive surface 21 of foam block 20 and thereby insure that foam block 20 will stick to the furniture leg or base and will further insure that the surrounding compressible material 14 will not in any way interfere or assist in supporting the furniture, but will nevertheless maintain the desired positioning therein of foam block 20.

When foam blocks 20 are initially supplied to the user, the adhesive surface 21 may be covered with flexible plastic sheet material, which may be removed when the foam drying block 20 is ready to be used and inserted into cavity 17 of furniture slide 10.

To assist in the sliding engagement of furniture slide 10 over a floor surface, the bottom surface 13 thereof is provided with a convex surface, as previously explained, which extends in this particular embodiment only in one direction of curvature from one side edge 23 to the other side edge 24 of sheet 11.

In addition, the outer entire perimeter edge of sheet 11 is provided with a rim 25 which also assists the furniture slide 10 to glide over irregular surfaces.

Variations of the structure may be made while still maintaining the spirit and intention of the claimed invention. For example, the plug 18 and replaceable foam drying block 20 need not be square and may be of any desired shape, such as rectangular, round, oval, etc.

In addition, the compressible material 14 need not necessarily be composed only of material such as sponge rubber, but may be composite material, for example, which may be made up of a sheet of foam rubber having a thinner sheet of felt adhered to the upper surface of the foam rubber.

We claim:

1. A slide for placement between an object to be moved and flooring over which it is to be moved which comprises:
   a. sheet of material having top and bottom faces and curvature providing a convex bottom face for sliding on a floor surface;
   b. compressible material adhered to said top face for support contact with an object to be moved;
   c. said compressible material having a plug portion thereof which is removable for thereby providing a cavity therein; and
   d. a foam drying block dimensioned for insertion into said cavity for support contact with an object to be moved and having adhesive applied to an upper face of said block whereby said block will remain adhered to an object to be moved when said sheet with the adhered compressible material is removed from said block.

2. The slide according to claim 1 wherein said foam block is thicker than said compressible material whereby said upper face of said drying block projects above said compressible material.

3. The slide according to claim 1 wherein said foam block is cellular polystyrene.

4. The slide according to claim 3, wherein said sheet is elongated with opposing side and end edges and said curvature is provided from side edge to side edge.

5. The slide according to claim 4 including an upturned rim on all of said edges.

6. The slide according to claim 5 wherein said sheet includes a thickened portion adjacent one end edge with a passage therethrough for securing a tow line.

7. The slide according to claim 6 wherein said sheet is comprised of a high density polyethylene material.

* * * * *